UNITED STATES PATENT OFFICE.

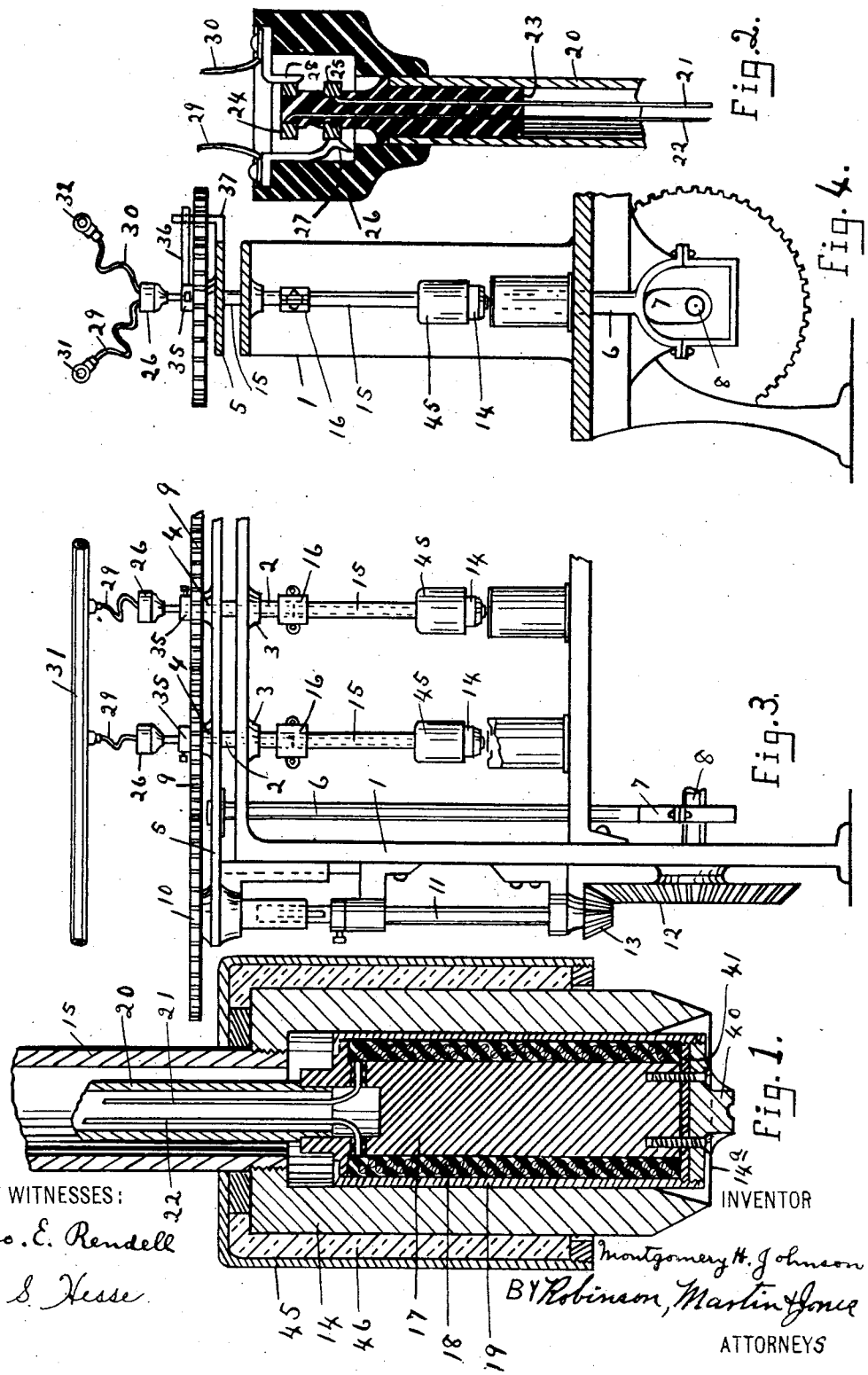

MONTGOMERY H. JOHNSON, OF UTICA, NEW YORK.

ELECTRICALLY-HEATED SOLDERING-IRON FOR CAN-CAPPING MACHINES.

934,539.   Specification of Letters Patent.   Patented Sept. 21, 1909.

Application filed August 31, 1908. Serial No. 451,096.

*To all whom it may concern:*

Be it known that I, MONTGOMERY H. JOHNSON, of Utica, in the county of Oneida and State of New York, have invented certain new and useful Improvements in Electrically - Heated Soldering - Irons for Can-Capping Machines; and I do hereby declare that the following is a full, clear, and exact description thereof, which will enable others skilled in the art to which it appertains to make and use the same, reference being had to the accompanying drawings, and to the characters of reference marked thereon, which form part of this specification.

The object of my present invention is to provide an improved electrically heated soldering iron and appurtenances for can capping machines particularly, which conserves the heat and electric energy required, and is well adapted for machines which have rotary soldering irons and machines having non-rotating soldering irons.

Figure 1 shows on an enlarged scale a vertical sectional view of a soldering iron embodying the features of my improvements. Fig. 2 is a vertical sectional view of the upper end of the soldering iron heater stem and of the detachable electrical connections. Fig. 3 is a partial side elevation of the machine, including the soldering irons and attachments. Fig. 4 shows a cross sectional view of the machine with the soldering irons installed.

Referring to the reference characters in a more particular description, 1 indicates the frame of the soldering machine, which carries in its upper portion vertical tubular spindle shanks 2—2. These are supported in fixed bearings 3 on the frame and in vertically movable bearings 4, and the spindles have a rising and falling motion in connection with the bearings 4. The bearings 4 are provided on a bar 5, which is raised and lowered by means of a connecting rod 6 and a cam 7 provided on the main shaft 8. Each of the spindle shanks 2 is also rotated by being provided with intermeshing gear pinions 9, the same being driven by a gear wheel 10 provided on the upper end of a telescoping shaft 11 driven from shaft 8 by the gear wheel 12 and pinion 13. The soldering iron 14, which is of a cylindrical form and hollow, has the usual circular operative edge 14$^a$ adapted to perform the soldering operation and is mounted on a tubular stem 15 adapted to be coupled to the stub spindle 2 by means of a clamp 16. The interior cavity of the soldering iron is of a cylindrical form and opens out through the lower end of the soldering iron, and is adapted to receive the core 17, the heating coil 18 and the heating coil casing 19, all mounted on the tubular heater stem 20. The internal recess or cavity in the soldering iron which receives the coil heater and its casing is of somewhat greater length than the length of these parts, allowing the heater to have a longitudinal movement within the soldering iron, and the fit is such as to allow a free rotary movement also.

Extending through the tubular stem 20 and connecting with the ends of the heating coil 18 are the electric conductors 21, 22. At the upper end of the tubular stem 20 the conductors 21 and 22 are passed through an insulating plug 23, which projects beyond the end of the stem and carries the contact pieces 24 and 25, preferably of ring form and to which the upper ends of the conductors 22 and 21 are respectively electrically connected. In a suitable case 26, preferably of insulating material, are mounted contact pieces 27 and 28 adapted to make electrical connection with the rings 24 and 25 respectively and allow, particularly in an emergency, a relative rotation of these parts and also permit a ready separation. With the contact pieces 27 and 28 are connected the flexible conductors 29 and 30, which may make electrical connections with main line conductors 31 and 32 over or in convenient position with reference to the machine.

The soldering iron core, with the heater and its appurtenances, is supported in suspended position within the soldering iron by its stem by being provided with a collar 35 clamped and held by a set-screw or otherwise, and running in contact, as the device is shown, with the upper side of the pinion 9. To hold the soldering iron core, heater and appurtenances against rotation in connection with the revolution of the soldering iron, the collar 35 may be provided with an arm 36, which will engage with a fixed stop 37 provided on the bar 5 of the machine.

In order to enable the heater with its appurtenances to serve another purpose, it may be provided on the lower end with a blunt point 40 adapted to rest on and hold down the can cap, particularly when the iron is being elevated or withdrawn. This point 40 will preferably be made in a separate piece from the core 17 and secured thereto with an interposed heat insulating disk 41, which obviates largely the heat being radiated at a point where it would be useless. The points 40, however, may be made integral with the core 17. The adjustment of the collar 35 is preferably such as to allow the cap engaging point 40 to project somewhat below the operative face of the soldering iron when both the soldering iron and heater, with its appurtenances, are held in suspended position. The introduction of the heater within a cavity in the soldering iron conserves the heat, and the heat may be further conserved and the radiation from the soldering iron reduced by inclosing the upper portion of the soldering iron in a jacket 45 and packing the space between the iron and the jacket with a non-conductor of heat 46, such as, for instance, asbestos.

Solder may be supplied to these irons in wire form, or the can caps may be provided with the necessary solder already attached or otherwise, these, being common expedients, are not illustrated.

In the operation of the machine, when the irons are allowed to descend, the cap point or projection 40 first engages the middle portion of the cap, holding it down, and as the iron further descends the operative edge 14ª comes into working position around the edge of the cap in the usual manner. The iron will be heated to the necessary temperature by electric current supplied through the conductors 29 and 30, and the flexibility of these conductors will allow for the necessary rising and falling movement of the soldering iron and heat. In the form of machine shown, the iron will be rotated while the heater and its appurtenances will be held against rotation. As the soldering iron is raised after the completion of its operation, the can cap is held down by the weight of the heater and its appurtenances until the iron is sufficiently withdrawn, to obviate any tendency to lift the cap off the can before the solder becomes set. The cap holding point or projection 40 is subsequently withdrawn, but without any tendency to lift the cap, for there is no cohesion of molten solder as between this point and the center of the cap.

There is a class of can capping machines in which the soldering iron does not rotate, but the can with its cap are rotated while in contact with the soldering iron. It is obvious that the construction of soldering iron with its heater and appurtenances herein shown is also well adapted for use in that class of machines.

It is evident that modifications and changes in and from the construction herein shown and described other than those hereinbefore mentioned, may be made without departing from the invention as hereinafter claimed.

What I claim as new and desire to secure by Letters Patent is:

1. A can capping machine having a hollow suspended soldering iron with a vertical cavity entering from the lower end of the iron, and an internal electric heating coil arranged in said cavity, said parts being constructed and arranged to permit a relative longitudinal movement of said iron and heating coil, substantially as set forth.

2. A can capping machine having a suspended rotatable soldering iron, having a cylindrical cavity opening to the lower end of the soldering iron, and an electric heating coil arranged in said cavity, said parts being constructed and arranged to permit a relative movement of said iron and heating coil, substantially as set forth.

3. In a can capping machine, a suspended rotatable soldering iron having a cylindrical cavity in the lower end, an independently supported electric heating coil within said cavity, and means for rotating the soldering iron, substantially as set forth.

4. A substantially cylindrical soldering iron, having a circular working face on its end, an internal cavity opening through the end of the iron within the circle of said face, an electric heating coil arranged within said cavity, means for supporting in suspended position and rotating the soldering iron, and means for suspending the heating coil within the cavity, substantially as set forth.

5. In a can capping machine, the combination of a suspended cylindrical soldering iron having an internal cavity opening through the lower end of the iron, a longitudinally-movable heating coil and core arranged within the cavity, and means for suspending said heating coil and core with a limited amount of longitudinal movement within the soldering iron, substantially as set forth.

6. In a can capping machine, in combination, a soldering iron having a vertical cavity entering from the lower end thereof, an electric heating coil arranged within said cavity, and means directly secured to said heating coil and movable therewith for engaging the cap.

In witness whereof, I have affixed my signature, in presence of two witnesses, this 21st day of August 1908.

MONTGOMERY H. JOHNSON.

Witnesses:
B. S. GILBERT,
EMMA S. HESSE.